United States Patent Office

3,347,678
Patented Oct. 17, 1967

3,347,678
PROCESSING CITRUS FRUITS
Karl Johan Stampe Villadsen, Arhus, Denmark, and Knud Julius Möller, Bellinzona, Switzerland, assignors to Aktieselskabet Grindstedvaerket, Arhus, Denmark, a Danish company
No Drawing. Filed Dec. 17, 1962, Ser. No. 244,881
Claims priority, application Great Britain, Dec. 27, 1961, 46,276/61
9 Claims. (Cl. 99—103)

This invention relates to improvements in and relating to the processing of citrus fruits. The term "citrus fruits" should be understood as including fruit of any member of the citrus family which is processed for juice production, including e.g. lemons, oranges, limes and grapefruit.

It is an object of the invention to provide for a treatment of the waste pulp from citrus juice production in order to increase the yield of juice from a given amount of fruit.

It is a further object of the invention to provide for a complete removal of remaining flesh from the peel in order to make the latter better suited for subsequent use, e.g. in marmalade or confections.

A further object of the invention is to provide for easy removal of the albedo or white constituents of the peel to obtain the flavedo or coloured constituents for further processing.

It has been known for many years that a treatment of berries and stone fruit with pectolytic enzymes tends to increase the yeld of juice obtained by pressing the fruit flesh.

It is further known that the cloudiness of fruit juices can be removed by a treatment of the juice with pectolytic enzymes.

The processing of citrus fruits aims at obtaining as much juice as possible from the fruit flesh, and to make the shells suitable for further processing by removing adhering flesh residues, and also some or all of the albedo, if desired.

In the citrus juices, however, cloudiness is a desired property, and since enzymes would counteract cloudiness, application of enzymatic treatment has always been considered unsuitable in this industry.

In the generally applied method of processing citrus fruits, the fruits are halved, and the juicy flesh is pressed or cut out of each half and passed onto screening equipment to remove seeds and coarser suspended particles.

The solids removed by the screening step are generally used as fodder for livestock or as manure although still containing a substantial amount of juice.

The screening is usually followed by deaeration and filling of the juice into suitable containers, and the juice is quickly sterilized and cooled. A quick sterilization is necessary because in addition to some natural constituents having the ability to hold minute tissue particles in suspension and thus ensure the desired cloudiness, the juice also has a natural content of enzymes capable of decomposing the said constituents, and these enzymes are destroyed by the sterilization.

The screened juice may also be stored in tanks without sterilization, a preservation with $SO_2$ or other suitable preserving agent being applied. By said storing, a pulp settles, which can be further processed according to the present method.

In our improved process, we follow the known procedure to get a first batch of juice containing the constituents ensuring cloudiness, when desired, but subject the removed solids to a treatment with pectolytic enzymes for a prolonged period at room temperature, or for a shortened period at increased temperature. By the enzymatic action, a further substantial amount of juice is liberated, and suitably extracted.

We further apply our treatment with pectolytic enzymes to the citrus shells from which the flesh has been removed for juice production. In the removal of the flesh, some is left. The remaining flesh and, if desired, part of the albedo layer has to be removed, if the shells are to be used for edible purposes.

Thus our improved process comprises the step of subjecting the pulp remaining after pressing a first batch of juice from the flesh of citrus fruits and, if desired, the shells, from which the flesh or albedo has to be removed, to a treatment with pectolytic enzymes.

The enzymatic treatment can be carried out at room temperature for a prolonged period, preferably for a period of 1–48 hours, or for a shortened period at an increased temperature, preferably not exceeding 55° C. For treating the pulp, the applied amount of pectolytic enzymes is preferably 0.02–0.5% by weight as calculated upon the weight of the pulp.

The pectolytic enzyme is commercially available in various degrees of enzymatic strength. The said proportions of pectolytic enzyme to pulp refer to a commercial single strength enzymatic preparation which is marketed under the trade name Pectolase DE 10.

The pectolytic strentgh of the said preparation is such that during 3 hours at 25° C. and at pH 3.7, the viscosity of a 1.8% aqueous solution of citrus pectin (20 H medium rapid set) is reduced from 55–60 seconds to about 10 seconds, as determined in a viscosimeter, having a water value of about 7 seconds.

Stronger enzymatic preparations can also be used in our method in suitably reduced proportions.

In admixing the enzymatic agent with the pulp, a thorough stirring should be applied to ensure a homogeneous distribution of the enzyme throughout the pulp. A renewed stirring a couple of hours later, when the enzymatic action has set in, will often be advantageous.

In dealing with unpreserved pulp, it is important that the enzymatic treatment is started at once in order to reduce the risk of fermentation of the pulp, and that pressing of the enzymatically treated pulp is carried out 2–6 hours after addition of the enzyme.

If the pulp cannot at once be subjected to enzymatic treatment, a preservation agent should be added, such as sulphur dioxide.

In the case of thus preserved pulps, the enzymatic treatment is advantageously extended over a longer period of, for example about 24 hours.

Before pressing off the juice, which has been liberated by the enzymatic treatment, a filter aid is advantageously admixed, such as kieselguhr or diatomite in an amount of 1–2% by weight of the pulp.

The recovered juice is screened, if necesary, and sterilized to destroy any remaining enzymes. If a reduction of viscosity of the juice is desired, additional pectolytic enzyme can be added, and the juice left standing before screening and sterilization, until the desired reduction of the viscosity is obtained.

When the shells are to be used for edible products, they are generally hardened in sea water or tap water with added sea salt for 2–3 days before being manually scrubbed inside to remove remaining flesh and, if desired, part of the albedo layer.

This cleaning of the shells is a difficult and labour-demanding process.

We have now found that by adding pectolytic enzyme to the first batch of saline water, in which the shells are immersed, the cleaning becomes very easy to perform, and part of the albedo can be removed by a light scrubbing.

We have further found that on placing the shells for about 24 hours in tap water, to which pectolytic enzymes have been added, all of the albedo can be removed, leaving only the paper-thin flavedo layer.

We prefer to use 0.1–0.5% by weight of pectolytic enzymes, calculated upon the weight of the shells, more being used when the albedo is to be removed, than when substantially only flesh is to be removed.

Our invention and the preferred manner, in which it is to be carried out, is further illustrated by the following non-limiting examples.

*Example 1*

To 1000 grams of orange pulp, from which the juice had been screened, and which contained 19.5% dry matter, was added 1 gram Pectolase DE 10. After standing at room temperature for 20 hours, a further yield of 254 grams of juice was obtained by pressing.

*Example 2*

A mixture of orange pulp and pectolytic enzyme as in Example 1 was left standing for 6 hours at 45° C. On pressing, a further yield of 349 grams of juice was obtained.

*Example 3*

The procedure of Example 1 was repeated, except that 10 grams of diatomaceous earth were added to the mixture of orange pulp and pectolytic enzyme. After 20 hours at room temperature, 478 grams of juice were obtained, as compared with a yield of only 32 grams, when pectolytic enzyme was omitted in the mixture of orange pulp and diatomaceous earth.

*Example 4*

30 over-ripe, Israelitic oranges were pressed and strained to yield 950 ml. of juice and 1050 grams of strained-off pulp.

The pulp was divided into three equal portions, to each of which were added 0.1% of Pectolase DE 10 and 2% of diatomite.

The first portion was pressed after 2 hours at room temperature, yielding 162 grams of juice, the second after 4 hours, yielding 215 grams of juice, and the third after 24 hours, yielding 200 grams of juice of reduced viscosity.

This experiment shows that the enzymatic treatment results in an increase of the yield of juice of about 68%, and that it is possible to obtain this increased yield by only 4 hours' treatment of the pulp.

The viscosity of the juice recovered after the enzymatic treatment is much higher than that of the juice of the first pressing, but can be reduced to normal by adding 0.05% pectolytic enzyme and letting the juice stand overnight before sterilizing.

*Example 5*

40 Italian lemons were pressed and strained to yield 975 ml. of juice and 866 grams of fruit pulp.

The pulp was subjected to enzymatic treatment at 45° C. after addition of filter aid as in Example 4, and the three portions were left standing for 2, 4, and 6 hours, respectively, yielding 53%, 63.5%, and 68.5% additional juice, respectively.

*Example 6*

A one year old lemon pulp, which had been preserved with 1–2 grams of SO$_2$ per kilogram pulp was used.

One portion of 4 kilograms was treated with 0.1% by weight of single strength pectolytic enzyme for 8 hours at room temperature, and yielded 3.4 kilograms of juice.

Another portion of 4 kilograms was similarly treated with 0.2% by weight of the enzyme, and also yielded 3.4 kilograms of juice.

A control portion without enzyme yielded 1.56 kilograms of juice.

*Example 7*

A one year old lemon pulp, preserved as in Example 6, but originating from another factory, was used.

4 kilograms were treated for 8 hours with 0.1% by weight of single strength pectolytic enzyme, yielding 3.2 kilograms of juice.

Another 4 kilograms were treated for 25 hours with 0.2% by weight of the pectolytic enzyme, yielding 3.8 kilograms of juice.

In both experiments, the juice was easily pressed off, leaving a dry feeling press cake.

A control portion without enzymatic treatment yielded only 0.4 kilograms juice, was very difficult to press, and left a moist and sticky press cake.

*Example 8*

To a batch of 400 kilograms one year old sulphur dioxide-preserved orange pulp were added 0.25% by weight of Pectolase DE 10 and 1% by weight of diatomaceous earth. After 29 hours' standing, 250 kilograms of juice were pressed off, leaving dry feeling press cakes.

A control without enzymatic treatment yielded 150 kilograms of juice, leaving moist and sticky press cakes.

*Example 9*

50 grams of fresh orange pulp resulting from a treatment with 0.1% by weight of Pectolase DE 10 for 22 hours were filtered on a paper filter. 25 grams of juice passed through the filter during 7 minutes.

In a similar experiment, using 0.3% of the enzyme, 25 grams of juice passed during 6 minutes.

In a control experiment without enzymatic treatment, the passage of 25 grams of juice took more than 26 minutes.

This experiment illustrates the time saving in using the enzymatic treatment.

*Example 10*

The pectolytic enzyme treatment can also be applied to the clarification of citrus juices.

A freshly pressed lemon juice, which had been preserved with sulphur dioxide, but not pasteurized, was centrifuged, whereby the pulp content of about 20% was reduced to about 5%.

Three portions of equal size were set up in cylinder glasses, one with an addition of 0.1% by weight of single strength pectolytic enzyme, the second with 0.3% of the enzyme, and the third as a control without addition of enzyme.

After 22 hours, the sediments measured 140 ml., 210 ml., and 70 ml., respectively.

Then 200 ml. of juice were decanted from each glass, equal portions of diatomite were added, and the three portions were filtered through paper filters.

The filtration time for 100 ml. was noted in each case, amounting to 7 minutes, 2 minutes, and 65 minutes, respectively, indicating the substantial clarification obtained by the enzymatic treatment.

*Example 11*

To illustrate the results of the enzymatic treatment of shells, the following experiments were made.

Halved oranges had the fruit flesh cut out with a curved knife, and one portion of the remaining shells was stored in tap water with an addition of 0.1% by weight of single strength pectolytic enzyme, the other being similarly stored with 0.3% of enzyme added.

After 19 hours, some effect could be observed upon the shells of the first portion, but not sufficient, whereas the albedo of the shells of the second portion was easily removed.

We claim:

1. Method of processing citrus fruits, comprising dividing the fruits in at least two pieces cutting the flesh from the shell parts, pressing juice from the flesh, subjecting the remaining pulp to the action of pectolytic enzyme in an amount corresponding to 0.02 to 0.5% by weight of single strength pectolytic enzyme as calculated upon the weight of the pulp, for a period of 1 to 48 hours at a temperature in the range between ambient temperature and a temperature not exceeding 55° C., and separating the liberated juice, the operation being carried out before any substantial deterioration of the juice by natural deterioration and any enzymatic treatment being terminated by heat.

2. The method of claim 1, in which the fruit pulp is treated with 0.02% by weight of pectolytic enzyme for 1–48 hours at a temperature not exceeding 55° C., after which the liberated juice is pressed off the pulp.

3. The method of claim 2, in which a filter aid is added before pressing off the liberated juice.

4. Method of processing citrus fruits, comprising dividing the fruits in at least two pieces cutting the flesh from the shell parts, pressing juice from the flesh, subjecting the pressed flesh to the action of pectolytic enzyme in an amount corresponding to 0.02 to 0.5% by weight of single strength pectolytic enzyme as calculated upon the weight of the pulp, for a period of 1 to 48 hours at a temperature in the range between ambient temperature and a temperature not exceeding 55° C., and separating the liberated juice, the shells being subjected to a further pectolytic enzymatic treatment to remove adhering flesh after which the enzymatic treatment is interrupted by heat, the operations being carried out before any substantial deterioration of the juice by natural deterioration.

5. The method of claim 4, in which the shells are immersed in water, to which pectolytic enzyme has been added in an amount of 0.1–0.5% by weight.

6. The method of claim 5, in which the water is tap water.

7. The method of claim 5, in which the water is sea water.

8. The method of claim 4, in which the shells after removal of flesh residues are immersed in water to which at least 0.3% by weight of single strength pectolytic enzyme has been added and left there until the albedo has been digested.

9. The method of claim 1, in which the enzymatically liberated juice is subjected to a viscosity reducing pectolytic treatment after having been pressed off.

References Cited
UNITED STATES PATENTS

| | | | |
|---|---|---|---|
| 2,320,036 | 5/1943 | Harris | 99—106 |
| 2,530,322 | 11/1950 | Ash | 99—105 X |
| 2,563,855 | 8/1951 | McColloch et al. | 99—105 |
| 2,995,448 | 8/1961 | Kew et al. | 99—105 |

A. LOUIS MONACELL, *Primary Examiner.*

R. A. AULL, *Examiner.*

M. VOET, *Assistant Examiner.*